United States Patent
Rao (10) Patent No.: US 9,510,360 B2
(45) Date of Patent: Nov. 29, 2016

(54) METHOD AND APPARATUS FOR A COORDINATED SCHEDULING METHOD TO AVOID MULTIPLEXING OF CONTROL AND DATA FOR POWER LIMITED USERS IN THE LTE REVERSE LINK

(75) Inventor: Anil M. Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 864 days.

(21) Appl. No.: 11/973,025

(22) Filed: Oct. 6, 2007

(65) Prior Publication Data

US 2009/0092103 A1 Apr. 9, 2009

(51) Int. Cl.
| | |
|---|---|
| *H04B 7/00* | (2006.01) |
| *H04W 72/12* | (2009.01) |
| *H04L 1/00* | (2006.01) |
| *H04L 1/18* | (2006.01) |
| *H04W 72/04* | (2009.01) |

(52) U.S. Cl.
CPC ........ *H04W 72/1257* (2013.01); *H04L 1/0026* (2013.01); *H04L 1/0027* (2013.01); *H04L 1/1887* (2013.01); *H04L 1/1812* (2013.01); *H04W 72/04* (2013.01); *H04W 72/1289* (2013.01)

(58) Field of Classification Search
CPC ............................. H04W 74/04; H04W 72/12
USPC ........ 370/203–211, 310, 328, 342–348, 464, 370/465, 480, 498; 455/422, 450–452
See application file for complete search history.

(56) References Cited

U.S. PATENT DOCUMENTS

| | | | |
|---|---|---|---|
| 6,999,438 B2 | 2/2006 | Nounin et al. | |
| 7,069,038 B2 * | 6/2006 | Hakkinen et al. | 455/522 |
| 7,751,363 B1 * | 7/2010 | Etemad et al. | 370/329 |
| 8,014,264 B2 * | 9/2011 | Li et al. | 370/203 |
| 2005/0213575 A1 * | 9/2005 | Shin et al. | 370/389 |
| 2006/0146762 A1 * | 7/2006 | Kuroda et al. | 370/335 |
| 2007/0064708 A1 * | 3/2007 | Usuda et al. | 370/394 |
| 2007/0223404 A1 * | 9/2007 | Khan et al. | 370/278 |
| 2008/0080422 A1 * | 4/2008 | Frederiksen et al. | 370/329 |
| 2008/0084845 A1 * | 4/2008 | Kuchibhotla et al. | 370/331 |

(Continued)

FOREIGN PATENT DOCUMENTS

JP 2007-214823 A 8/2007

OTHER PUBLICATIONS

IEEE 100 The Authoritative Dictionary of IEEE Standards Terms, IEEE, 2000, pp. 1, 2 and 716.*

(Continued)

*Primary Examiner* — Dmitry H Levitan
(74) *Attorney, Agent, or Firm* — Fay Sharpe, LLP (57) ABSTRACT

A system and method for coordinated scheduling of a telecom device to avoid multiplexing of control signaling and data signaling is disclosed. The method includes defining a round trip time for signaling transmissions. The method further includes allocating the signal transmissions and signal retransmissions for uplink transmissions which are directed by a first scheduling mode and downlink transmissions which are directed by a second scheduling mode to take place in a subframe time position where control signaling transmissions are not being transmitted in subframes where data transmissions and retransmissions are being transmitted. This system and method are particularly useful for telecommunication devices in power limited situations.

21 Claims, 5 Drawing Sheets

(56) References Cited

U.S. PATENT DOCUMENTS

| | | | |
|---|---|---|---|
| 2008/0102846 A1* | 5/2008 | Kim et al. | 455/450 |
| 2008/0247375 A1* | 10/2008 | Muharemovic et al. | 370/344 |
| 2008/0311919 A1* | 12/2008 | Whinnett et al. | 455/447 |
| 2008/0316959 A1* | 12/2008 | Bachl et al. | 370/329 |
| 2009/0010240 A1* | 1/2009 | Papasakellariou et al. | 370/344 |
| 2009/0047902 A1* | 2/2009 | Nory et al. | 455/13.4 |
| 2009/0196249 A1* | 8/2009 | Kawamura et al. | 370/330 |
| 2009/0201885 A1* | 8/2009 | Kuroda et al. | 370/335 |
| 2009/0217118 A1 | 8/2009 | Miki et al. | |
| 2009/0316811 A1* | 12/2009 | Maeda et al. | 375/260 |

OTHER PUBLICATIONS

PCT/US2008/011077, International Search Report, Feb. 18, 2009, 3 pages.

PCT/US2008/011077, Written Opinion of the International Searching Authority, Feb. 18, 2009, 7 pages.

Lucent Technolgies: "Downlink Multiplexing" 3GPP TSG-RAN WG1 #46-bis, Oct. 9-13, 2006, Seoul, Korea, 8 pages.

NTT Docomo, Fujitsu, Mitsubishi Electric, NEC, Sharp, Toshiba Corporation "L1/L2 Control Channel, Structure for E-UTRA Uplink", 3GPP TSG RAN WG1 Meeting #45, Shanghai, China, May 8-12, 2006, 9 pages.

Philips, NXP Semiconductors, "Control signaling for dynamically - and persistently-scheduled transmissions in E-UTRA", 3GPP TSG RAN WG1 Meeting #49-bis, Orlando, USA, Jun. 25-29, 2007, 4 pages.

Alcatel-Lucent, "Signaling Power Offsets in the Persistent Scheduling Assignment Message to Handle Data/Control Multiplexing in the E-UTRA UL", 3GPP TSG-RAN WG2 #59, Athens Greece, Aug. 20-24, 2007, 2 pages.

3GPPTS, $3^{rd}$ Generation Partnership Project; Technical Specification Group Radio Access Network; Evolved Universal Terrestrial Radio Access (E-UTRA); Physical Layer procedures (release 8), Sep. 2009, 77 pages.

3GPP TS 36.213 V2.0.0 (Sep. 2007), 3rd Generation Partnership Project; Technical Specification Group Radio Access Network; Evolved Universal Terrestrial Radio Access (E-UTRA); Physical Layer procedures (Release 8); Sep. 24, 2007; 14 pages.

English Bibliography for Japanese Patent Application Publication No. 2007-214823A, published Aug. 23, 2007, Printed from Thomson Innovation on Jun. 20, 2012 (3 pages).

* cited by examiner

METHOD AND APPARATUS FOR A COORDINATED SCHEDULING METHOD TO AVOID MULTIPLEXING OF CONTROL AND DATA FOR POWER LIMITED USERS IN THE LTE REVERSE LINK

BACKGROUND OF THE INVENTION

This disclosure relates to an apparatus and method to avoid multiplexing of control and data for mobile users in a Long Term Evolution (LTE) reverse link. More particularly, this disclosure relates to a method and apparatus for coordinating the uplink and downlink scheduling assignments for power-limited users in the LTE reverse link.

While the disclosure is particularly directed to a particular telecommunications scheduling method to avoid multiplexing for power limited users, and thus will be described with specific reference thereto, it will be appreciated that this disclosure may have usefulness in other fields and applications. For example, this disclosure may be used in a variety of telecommunication networks where uplink and downlink scheduling assignments may be coordinated.

Figure 1:
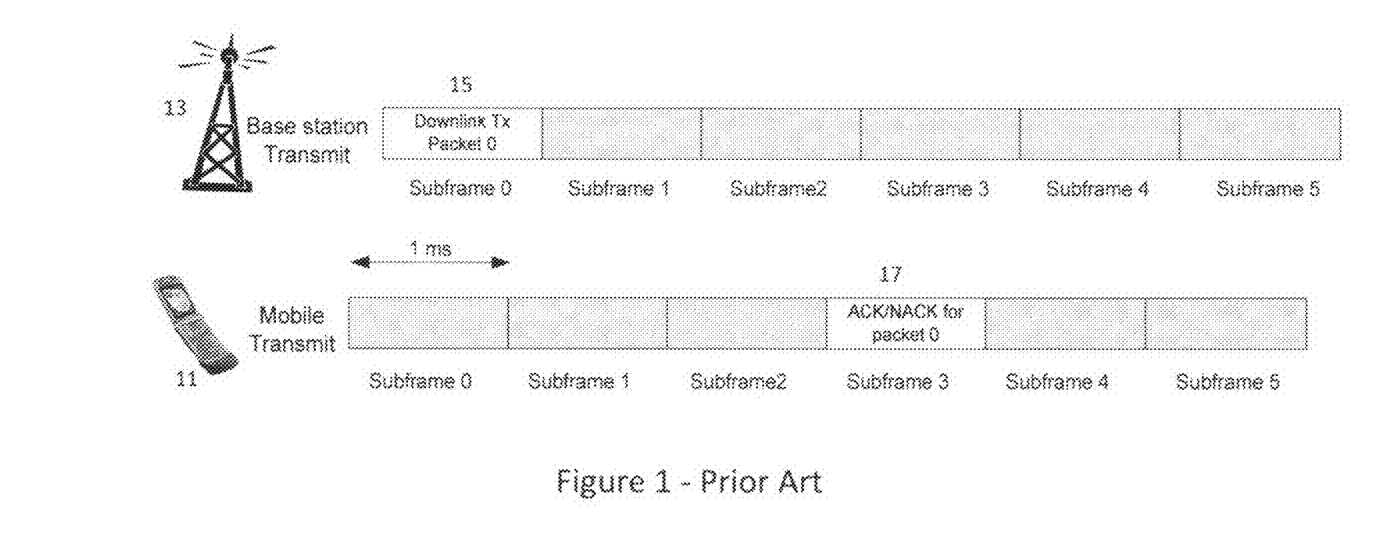
FIG. 1 illustrates a prior art example of multiplexing on a communication network.
Figure 2:
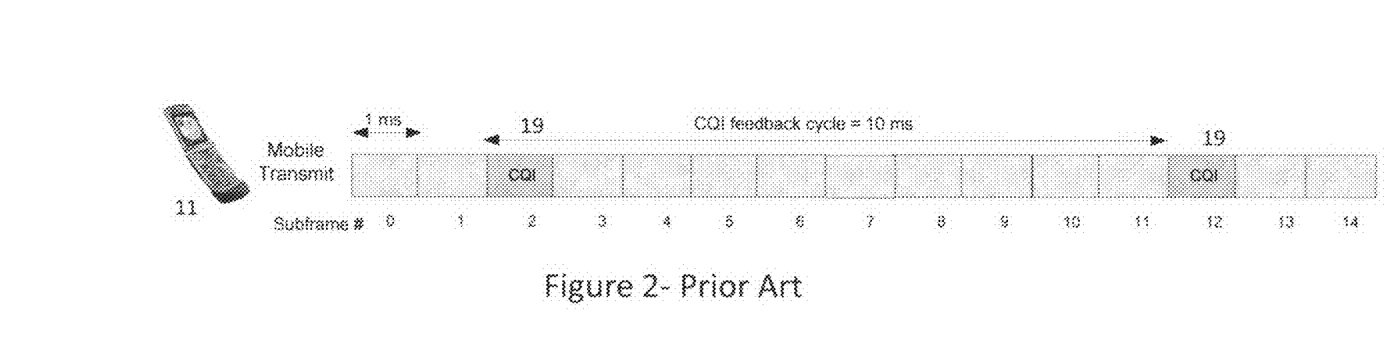
FIG. 2 is another prior art example illustrating a timing relationship between downlink and uplink transmissions.

By way of background, 3rd Generation Partnership Project (3GPP) LTE has chosen Single Carrier Frequency Domain Multiple Access (SC-FDMA) for the reverse link. As a consequence, when control signaling is transmitted from the mobile terminal to the base station at the same time that there is data transmitted, then the control signaling must be multiplexed together with the data through appropriate rate matching of the data information. The rate matching results in puncturing of the coded data symbols in order to make space for the control channel signaling 17, 19, as shown in FIG. 1 and FIG. 2.

Examples of control information which needs to be sent in the reverse link in LTE include ACK/NACK information to support Hybrid Automatic Repeat reQuest (HARQ) in the forward link and Channel Quality Indication (CQI) which provides information to the base station 13 on the quality of the channel in the forward link. These two main types of control signaling are sent in the uplink in order to support the downlink.

ACK/NACK for HARQ—For every packet sent to the mobile in the downlink that the mobile detects, the mobile will generate a positive acknowledgement (ACK) if the packet was decoded successfully. The mobile will generate a negative acknowledgement (NACK) if the packet could not be decoded successfully. The mobile will transmit the ACK or NACK at a fixed time after the base station 13 transmitted the packet to the mobile. As shown in FIG. 1, if the downlink packet 15 was transmitted at subframe 0, the mobile 11 sends the ACK or NACK back to the base station 13, on the uplink, three subframes later at subframe 3 (note that the subframe duration in LTE is 1 millisecond). Note that this is but one example of the prior art, and the subframe duration, as well as the number of subframes between the downlink packet transmission and the mobile transmission of the ACK or NACK, may vary according to different embodiments.

CQI—CQI is a measurement of the downlink channel quality as measured by the mobile 11. The mobile 11 makes such a measurement and transmits it in the uplink back to the base station 13. The transmission of CQI information 19 is controlled by the base station 13 through higher layer of signaling whereby the base station sets up a starting time and a periodic reporting cycle. As shown in FIG. 2, CQI 19 is transmitted by the mobile 11 every 10 milliseconds, starting in subframe 2. In this embodiment, the CQI 19 is again reported in subframe 12 and so forth. This also is but one embodiment in the prior art, and this periodic reporting cycle may vary.

Puncturing the data symbols with control information increases the code rate on the data channel, which will reduce the Quality of Service (QoS) on the data channel. This, in turn, increases the error rate if no action is taken in order to compensate for the puncturing 21.

Figure 3:
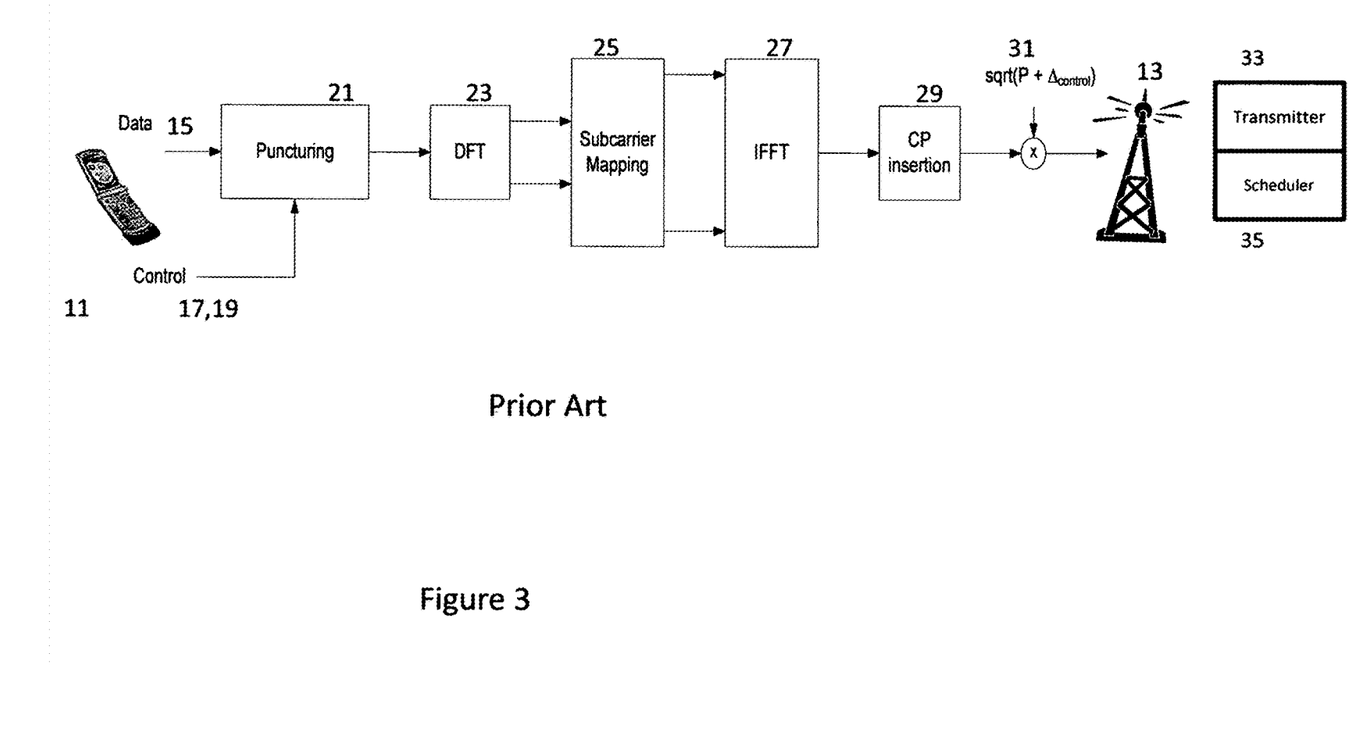
FIG. 3 is another prior art example of a control transmission, in this case CQI being transmitted on the uplink in a telecommunications network.

As shown in FIG. 3, it is useful to maintain the QoS on the data channel in the presence of control channel multiplexing. One popular approach is for the base station 13 to signal an additional power offset 31 to the mobile 11 to compensate for the puncturing 21 introduced from this control channel signaling 17, 19. As illustrated in FIG. 3, the signal travels through the Discrete Fourier Transform (DFT) 23, through subcarrier mapping 25, Inverse Fast Fourier Transform (IFFT) 27 and through cyclic prefix (CP) insertion 29, at a power of P+Δ control. P is the nominal transmit power setting the mobile 11 uses when there is no control channel multiplexing. P plus A control is the adjusted power setting when a specific type of control signaling (e.g. ACK/NACK 17, CQI 19, etc.) is multiplexed with the data 15. FIG. 3 illustrates the concept of applying additional power offset Δ control to the nominal power level P to compensate for the puncturing 21 of the data 15 with the control information 17, 19.

There are commonly two types of scheduling supported in the 3GPP LTE. These types of scheduling grants include dynamic scheduling and persistent scheduling. In dynamic scheduling, every packet transmission from the base station 13 to the mobile 11 (downlink) and the mobile 11 to the base station 13 (uplink) are explicitly scheduled by the base station 13 through the use of a scheduling grant. There is a separate scheduling grant for downlink transmissions and uplink transmissions. The scheduling grant is issued through the base station scheduler 35. This scheduling grant may be sent on the Physical Downlink Control CHannel (PDCCH). Persistent scheduling is generally used in order to alleviate control channel bottlenecks in the LTE. With persistent scheduling, a higher layer message (layer 2 or layer 3) informs the mobile 11 that it is scheduled at predetermined time instances and at predetermined locations in frequency. Through persistent scheduling, a specific packet size and modulation scheme may be used.

There is a separate persistent scheduling message for the uplink and the downlink. For example, a mobile 11 may be assigned a persistent allocation which allows it to transmit in the uplink or receive in the downlink every 5 milliseconds using 360 kilohertz of bandwidth starting at a frequency location with a modulation scheme of QPSK and a packet size of 320 bits. This type of scheduling is especially useful for supporting a large number of users which have a traffic source with a predictable arrival rate. Voice over Internet Protocol (VoIP) is one prominent example that often uses persistent scheduling.

One common problem with multiplexing in the prior art is that a mobile may already be transmitting at a maximum power in order to maintain the QoS on the uplink data channel in the absence of uplink control information. Stated another way, when the control information is multiplexed with the uplink data information, the solution in the current art of increasing the mobile transmit power is not applicable. For example, adding delta control to an already maxed out power is not feasible because the mobile is already operating at maximum power. In instances such as these, the QoS suffers due to this multiplexing solution.

There is a need in the industry for a method that permits data and control to be scheduled in a way that multiplexing is not necessary. There is also a need in the industry for a method and a system that provides the solution where uplink and downlink scheduling assignments are coordinated in such a way to avoid multiplexing specifically for power limited mobile users. It would also be useful for this solution to be equally feasible regardless or uplink and downlink scheduling grants.

The present disclosure contemplates a new and improved method that resolves the above-referenced difficulties and others.

SUMMARY OF THE INVENTION

A method and system for coordinated scheduling of a mobile in order to avoid multiplexing of control signaling and data signaling for power limited mobiles is provided. This disclosure allows for control signaling transmissions and data signaling transmissions to be scheduled on the uplink and the downlink during different time subframes. This disclosure is particularly useful for power limited mobiles where multiplexing comes at the cost of quality of service.

In one aspect of the disclosure the method for coordinated scheduling of telecommunication devices comprises defining a round trip time for signaling transmissions, defining a round trip time for data signaling retransmissions and allocating the signaling transmission and signaling retransmission for uplink transmissions which are directed by a first scheduling mode and downlink transmissions which are directed by a second scheduling mode to take place in subframe time positions where control signaling transmissions are not being transmitted in subframes that data transmissions and retransmissions are being transmitted.

In accordance with another aspect of the present disclosure, the method includes identifying whether the telecommunication device is a power limited mobile prior to executing the coordinated scheduling.

In accordance with another aspect of the present disclosure, the telecommunication device is identified as a power limited mobile via head room reporting.

In accordance with another aspect of the present disclosure, the method includes that the first scheduling mode and second scheduling mode are both dynamic.

In accordance with another aspect of the present disclosure, the method includes that the first scheduling mode is dynamic and the second scheduling mode is persistent.

In accordance with another aspect of the present disclosure, the method includes that allocating the signaling transmissions and signaling retransmissions includes restricting downlink data transmissions in subframes that would delegate a response transmission in the uplink to subframes that have persistently scheduled data transmissions.

In accordance with another aspect of the present disclosure, the method includes that the first scheduling mode is persistent and the second scheduling mode is dynamic.

In accordance with another aspect of the present disclosure, the method includes that allocating the signaling transmission and signaling retransmission includes restricting uplink data transmissions in subframes that have response transmissions persistently scheduled in the uplink.

In accordance with another aspect of the present disclosure, the method includes that the first scheduling mode and second scheduling mode are both persistent.

In accordance with another aspect of the present disclosure, the method further comprises scheduling allocations for the transmissions to take place with a time offset in subframe time positions so that scheduled transmissions do not coincide.

In accordance with another aspect of the present disclosure, a system for avoiding multiplexing of control and data transmissions comprises a mobile station configured to transmit uplink controlled signaling transmissions, uplink control signaling responses and uplink data signaling transmissions and retransmission according to a first scheduled grant, a base station transmitter configured to transmit downlink data signaling transmissions which call for the control signal responses according to a second scheduled grant and a base station scheduler configured to schedule the mobile station and base station transmitter to transmit signaling transmissions during time frames where the control signaling transmissions, control signaling responses and data signaling transmissions and retransmissions are not allocated to the same time subframe.

In accordance with another aspect of the present disclosure, the system includes that the mobile station is a power limited mobile station.

In accordance with another aspect of the present disclosure, the system includes that the first and second schedule grants are dynamic scheduling.

In accordance with another aspect of the present disclosure, the system includes that the first scheduled grant is persistent scheduling and the second scheduled grant is dynamic scheduling and the base station scheduler prohibits the downlink data signaling transmissions during time frames that call for uplink control signal responses in time subframes where the uplink data signaling transmissions and retransmissions are persistently allocated.

In accordance with another aspect of the present disclosure, the system includes that the first scheduled grant is dynamic scheduling and the second scheduled grant is persistent scheduling and the base station scheduler prohibits the uplink data signal transmissions and retransmissions during time subframes where the uplink control signaling transmissions or uplink control signaling responses are persistently allocated.

In accordance with another aspect of the present disclosure, the system includes that the first and second schedule grants are persistent scheduling and the transmissions take place with a time offset in subframe time positions so that persistently scheduled data and control transmissions do not take place in the same time subframe.

In accordance with another aspect of the present disclosure, the system for coordinated scheduling of control and data transmissions comprises a first transmitter configured to communicate transmissions on the uplink, a second transmitter configured to communicate transmissions on the downlink and a scheduler configured to coordinate first and second transmitters to communicate the transmissions in order the data transmissions and control transmissions are not transmitted during common subframes.

In accordance with another aspect of the present disclosure, the system includes that the control transmissions includes retransmissions.

In accordance with another aspect of the present disclosure, the system includes that the control transmissions include ACK/NACK responses.

In accordance with another aspect of the present disclosure, the system includes that control transmissions include quality channel information transmissions.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 4:
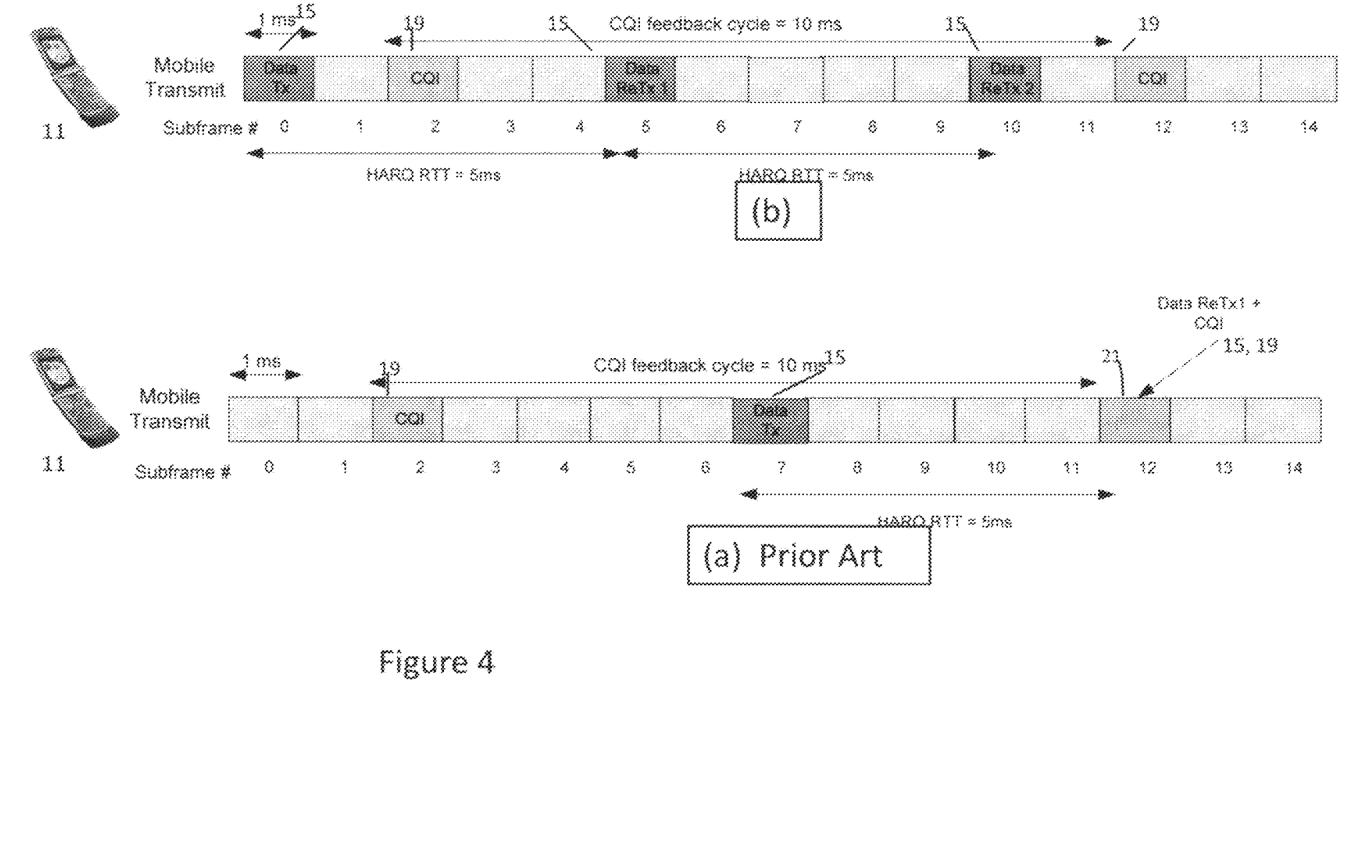
FIG. 4(a) is a prior art example of scheduling in a telecommunications network.
FIG. 4(b) is a figure illustrating scheduling of uplink data such that transmission and retransmission of uplink data, not multiplexed, according to the disclosure.

Referring now to the drawings wherein the showings are for purposes of illustrating the disclosed embodiments only and not for purposes of limiting the same, FIGS. 4(a) and (b) shows scheduling of uplink data transmissions. This uplink is being transmitted from the mobile 11 to the base station 13. This description shows but one embodiment. It should be appreciate that other embodiments exist and still fall within the scope of the claims. For example, the mobile unit 11 may include any number of communication devices, including, but not limited to, wireless telephones, VoIP telephones, laptop computers, desktop computers, WiFi telephones, etc. These devices are typical user equipment used to communicate through compatible lines. In this embodiment, the mobile transmission device is pictured as a mobile telephone 11.

The general idea of this disclosure is to coordinate a downlink scheduling and uplink scheduling in such a way as to avoid the case where control channel information (to support the downlink) needs to be transmitted on the uplink at the same time as data is transmitted on the uplink. This disclosure is especially useful for mobile devices that are identified to be power-limited in the uplink. A power-limited user in the uplink is defined as a user which cannot support the required additional power offset delta control 31, FIG. 3, from the nominal power level P due to maximum transmit power constraints. It should be noted that this includes users which are already transmitting at maximum power for the uplink data alone.

3GPP LTE will support what is known as mobile power head room reporting. This is a report from the mobile 11 to the base station 13 indicating that the maximum mobile transmit power minus the current nominal power level setting P. With such a report the base station is able to determine if a mobile is classified as being power-limited. This described method is especially useful for power-limited mobiles so that these mobiles do not sacrifice QoS due to multiplexing. In some embodiments, the scheduler 35 houses the software that determines which transmissions receive priority. The details for some exemplary embodiment are outlined below.

Still referring to FIGS. 4(a) and (b), in at least one form it is the base station scheduler 35 which configures the periodicity of the CQI transmission and the subframe position in time. In this embodiment, a subframe position in time is equal to one millisecond. However, this is not necessarily the case in all embodiments. One millisecond is an arbitrary unit of time which is for exemplary purposes only.

Referring to FIG. 4(a), improper scheduling of uplink data transmission is shown. In this embodiment, CQI is scheduled to be transmitted periodically every ten subframe positions. As FIG. 4(a) shows, CQI 19 is transmitted in subframe No. 2 and then again in subframe No. 12. It should be noted that also in subframe No. 12, data is sent on the uplink due to improper scheduling causing multiplexing forcing the data and control information to be punctured 21. Because data was transmitted in subframe 7, a retransmission would be transmitted in this embodiment in subframe 12 because HARQ retransmission time is 5 subframes. It should be noted that special care should be taken in employing synchronous HARQ in the reverse link because retransmissions of packet are generally placed at a fixed time periods after the initial transmission. In this example, that fixed time is 5 milliseconds. The time is defined in the 3GPP LTE standard as the HARQ round trip time. Therefore, according to the present application, it is useful when scheduling the initial uplink packet transmission for the mobile that none of the retransmissions will take place in a subframe in which the mobile is configured to transmit CQI. It should also be noted that there is typically a maximum number of HARQ transmissions configured for the mobile.

In one embodiment, the base station scheduler 35 does not schedule a power-limited mobile 11 to transmit data 15 in the uplink, either with a dynamic scheduling grant or persistent scheduling grant, at those subframes for which the mobile has been configured to transmit CQI 19. This should apply to both the first transmission of the mobile as well as any other retransmission that may be necessary when utilizing HARQ in the uplink.

Now referring to FIG. 4(b), an example is provided where the initial uplink data transmission 15 is scheduled in such a way that the initial transmission and possible retransmissions do not overlap with subframes in which the mobile is configured to transmit CQI 19. In this embodiment, CQI 19 is scheduled to be transmitted at subframe 2 and 12 and data transmissions 15 are scheduled to be transmitted at subframe 0, again at 5, and again at 10. In this embodiment, there is no multiplexing with the transmission or the retransmissions and the CQI 19. The data was scheduled to be transmitted at times when multiplexing would not be necessary.

This disclosure is also related to a method for avoiding multiplexing of ACK/NACK 17 together with uplink data transmission. Generally, uplink and downlink transmissions may take place through one of the two different scheduling modes. Therefore, this disclosure outlines the four different possible cases, separately. The four different cases are dynamic scheduling in both the uplink and downlink, persistent scheduling in the uplink and dynamic scheduling in the downlink, persistent scheduling in the downlink and dynamic scheduling in the uplink, and persistent scheduling in both the uplink and the downlink.

Case 1, Dynamic Scheduling in Both the Uplink and the Downlink

Given a downlink scheduling grant in a particular subframe, it is known precisely, in this embodiment, in which subframe the mobile will respond by transmitting an ACK or NACK 17. In this case, the base station scheduler 35, FIG. 1 does not schedule uplink data transmissions 15 for power limited mobiles 11 in the subframes in which the mobile 11 will attempt to response with an ACK/NACK 17 for an already scheduled downlink transmission. It should also be noted that in the case of synchronous HARQ retransmission for uplink data 15, special care should be taken. Therefore, given an uplink scheduling grant by a base station 13 (which permits a power limited mobile 11 to transmit in a given subframe), the base station 13 does not schedule downlink transmissions 15 to the mobile 11 at the time instances which would require an ACK/NACK 17 to be sent by the mobile 11 in subframes in which the mobile is transmitting uplink data. This scenario should include initial transmissions as well as any retransmissions that may be required.

Figure 5:
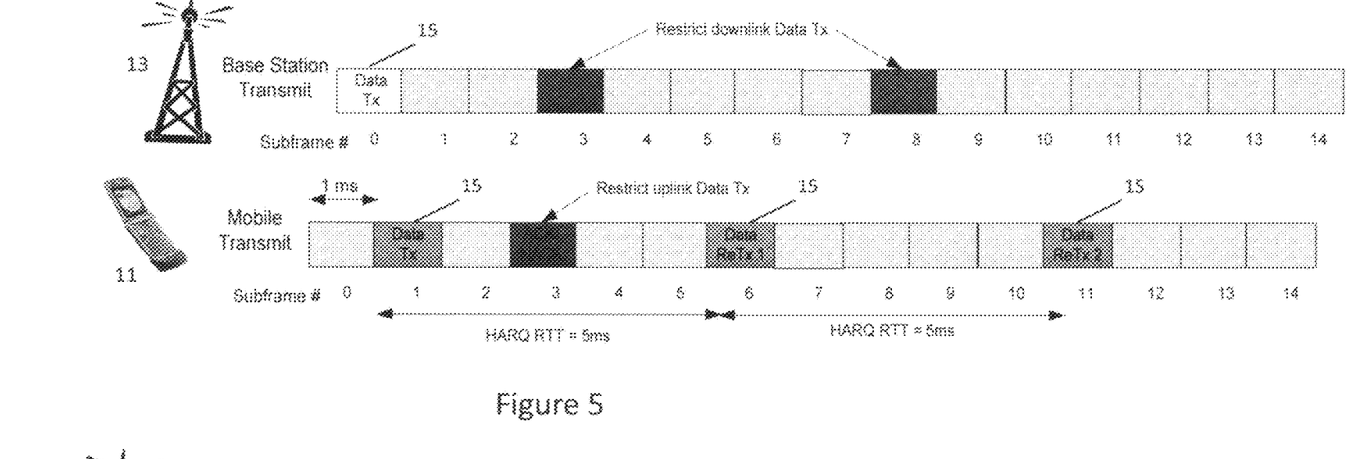
FIG. 5 is an example of scheduling and scheduling restrictions according to this disclosure.

Now referring to FIG. 5, an example of restricting on uplink and downlink scheduling to avoid multiplexing ACK/NACK 17 together with uplink data transmissions 15 is shown. This figure illustrates a downlink transmission 15 in subframe 0. The base station 13 does not schedule the mobile in subframe 3 because the ACK/NACK 17 is scheduled to be transmitted. This is the case, because in this embodiment, the ACK/NACK 17 follows three subframes after the downlink data transmission 15. Furthermore, if the HARQ round trip time is 5 milliseconds (or subframes), the retransmission will be in subframe 6 and 11. Therefore, the base station 13 will restrict downlink transmissions 15 in subframes 3 and 8, so that the ACK/NACK 17 is not multiplexed with the retransmissions that will take place in subframes 6 and 11. In conclusion, the base station, will restrict downlink data transmissions 15 in frames 3 and 8 and restrict uplink data transmissions in subframe 3. The downlink data transmissions 15 that would take place in subframe 3 and 8 would create a situation where ACK/NACK 17 transmission would be sent uplink in frames 6 and 11. Therefore, the base station scheduler 35 will not schedule downlink data transmissions 15 in those subframes. Furthermore, a base station scheduler 35 does not schedule an uplink data transmission 25 in subframe 3 because an ACK/NACK 17 uplink transmission is expected to take place in response to the downlink data transmission 15 sent in subframe 0.

Case 2, Persistent Scheduling in the Unlink and Dynamic Scheduling in the Downlink In the case of persistent scheduling in the uplink, the mobile 11 is informed via higher layer signaling that it is permitted to transmit uplink data in predefined time instances (e.g. certain preferred subframes) and in certain locations and frequency. As far as multiplexing with control signaling is concerned, this disclosure is primarily involved with predefined subframes in which the mobile is configured to transmit uplink data 17. In this case of persistent scheduling for uplink data 17, the base station 13 does not schedule packet transmissions in the downlink to the mobile 11 in the subframes which would call for an ACK/NACK 17 to be transmitted by the mobile in the same subframes as it has been configured to transmit uplink data 15 by the persistent scheduling assignment.

Figure 6:
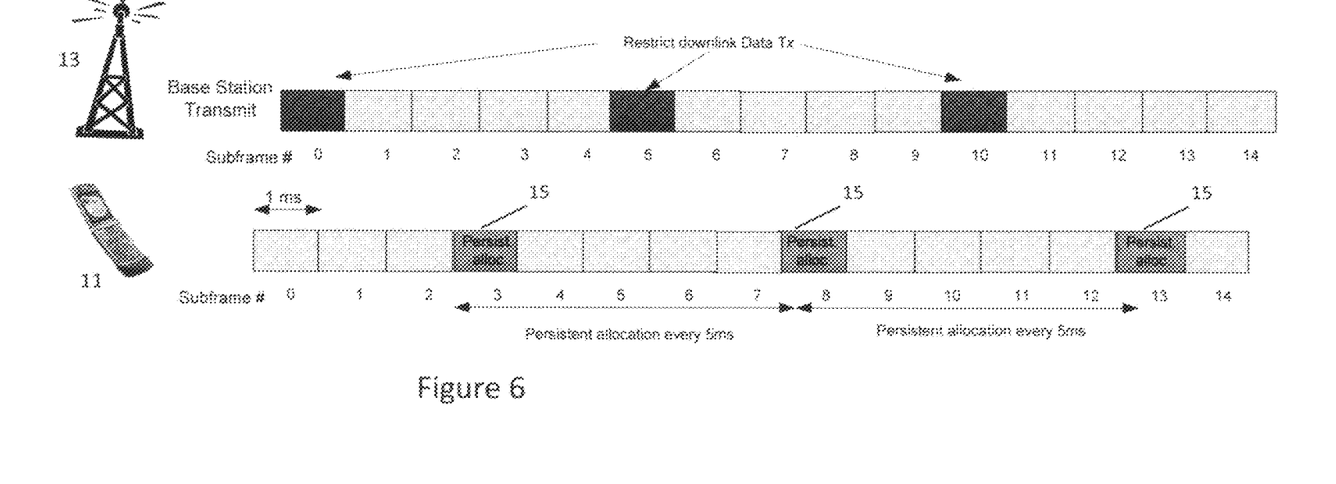
FIG. 6 is an example of restrictions on downlink scheduling to avoid multiplexing according to this disclosure.

Now referring to FIG. 6, an example of the above described case is shown. In FIG. 6, the mobile has been configured with a persistent scheduling for its uplink data transmission 15 every five subframes starting at subframe 3. Furthermore, the time between a downlink transmission to a mobile 11 and the transmission of the corresponding ACK/NACK 17 is three subframes, as in FIG. 1. In this embodiment, the scheduler 35 of FIG. 3 restricts scheduling of downlink data 15 to the mobile in subframe 0 and every 5 subframes afterwards. This example downlink scheduling would be used to avoid multiplexing ACK/NACK 17 together with persistently scheduled uplink data transmissions 15. In this embodiment, the persistent uplink scheduling allocation in subframe 3 and every 5 subframes afterwards would call for a restriction of downlink transmissions 15 to the mobile 11 in subframe 0 and every 5 subframes afterwards. In this embodiment, if a downlink data transmission 13 were to occur in one of the restricted subframes, an ACK/NACK 17 would be transmitted in the same subframe as an uplink data transmission requiring multiplexing.

This is of course but one embodiment and many of these factors could change and still fall within the scope of the claims. For example, the persistent scheduling may require uplink transmission every ten frames, or 13 frames, etc. Also, time between downlink transmissions and corresponding response ACK/NACKs may be any number of subframes. Furthermore, the amount of time that a subframe represents may vary according to different embodiments of this disclosure.

Case 3, Persistent Scheduling in Downlink and Dynamic Scheduling in the Uplink

In the case of persistent scheduling in the downlink, the mobile 11 is informed via higher layer signaling that there will potentially be data transmitted to it in the downlink in predefined time instances (e.g. certain predefined subframes). Note that it is not necessary for any data to be transmitted in the downlink and the persistently allocated subframes. In the case of persistent scheduling for downlink data, the base station 13 does not schedule uplink data packet transmissions 15 in the subframes in which an ACK/NACK 17 may need to be transmitted in response to a persistently allocated downlink transmission to the mobile 11. Note that similar to the previously discussed cases, this embodiment should also take into account any uplink synchronous retransmissions of the uplink data 15 that might be required.

Figure 7:
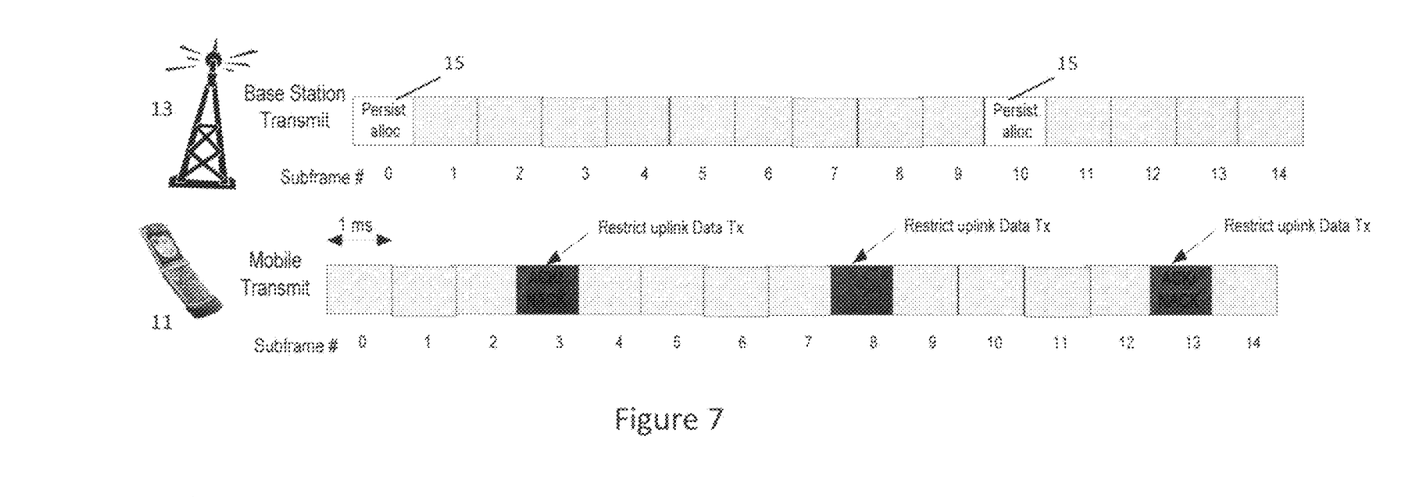
FIG. 7 is an example of restrictions on uplink scheduling to avoid multiplexing according to this disclosure.

Now referring to FIG. 7, an example of restrictions on uplink scheduling to avoid multiplexing ACK/NACK 17 together with persistently scheduled downlink data transmissions 15 is shown. In this example, the base station scheduler 35 has configured the mobile 11 with a persistent scheduling grant for its downlink data transmission 15 every ten subframes, starting at subframe 0. Furthermore, the time between a downlink transmission to a mobile and the transmission of a corresponding ACK/NACK 17 is 3 subframes (as was the case in the previous examples). Furthermore, in this embodiment, the time between synchronous HARQ transmission in the uplink is 5 subframes, as was the case in the previous examples. However, again it should be noted that this is but one embodiment and the time between synchronous HARQ transmissions may be any unit of time.

In this embodiment, scheduling of uplink data is restricted for this user at subframe 3 and every 10 subframes afterwards. Furthermore, scheduling would be restricted of uplink data to this user in subframe 8 and every ten subframes afterwards. Given a persistent downlink scheduling allocation in subframe 0 and every ten frames afterwards, scheduling is restricted in uplink transmissions for this mobile in subframe 3 and every 10 subframes afterwards as those subframes would potentially call for an ACK/NACK 17 to be transmitted by the mobile 11 in the persistently allocated uplink subframes. Furthermore, in this embodiment, subframe 8 and every 6 subframes afterwards would also be restricted if the mobile 11 is configured to use HARQ retransmissions.

Case 4, Persistent Scheduling in Both Uplink and Downlink

In the case of persistent scheduling in both the uplink and the downlink, these persistent allocations should be offset in time in such a way that the persistent scheduled uplink transmissions do not coincide with those subframes in which the mobile would need to transmit an ACK/NACK 17 in response to a transmission in the downlink. Given an offset of X subframes between a downlink transmission and a transmission of the corresponding ACK/NACK 17 by the mobile 11 in the uplink (X=3 in the previous examples), then the configuration would be restricted of the uplink/downlink persistent allocation, such that the uplink persistent allocation occurs X subframes later than the downlink persistent scheduling allocation.

Figure 8:
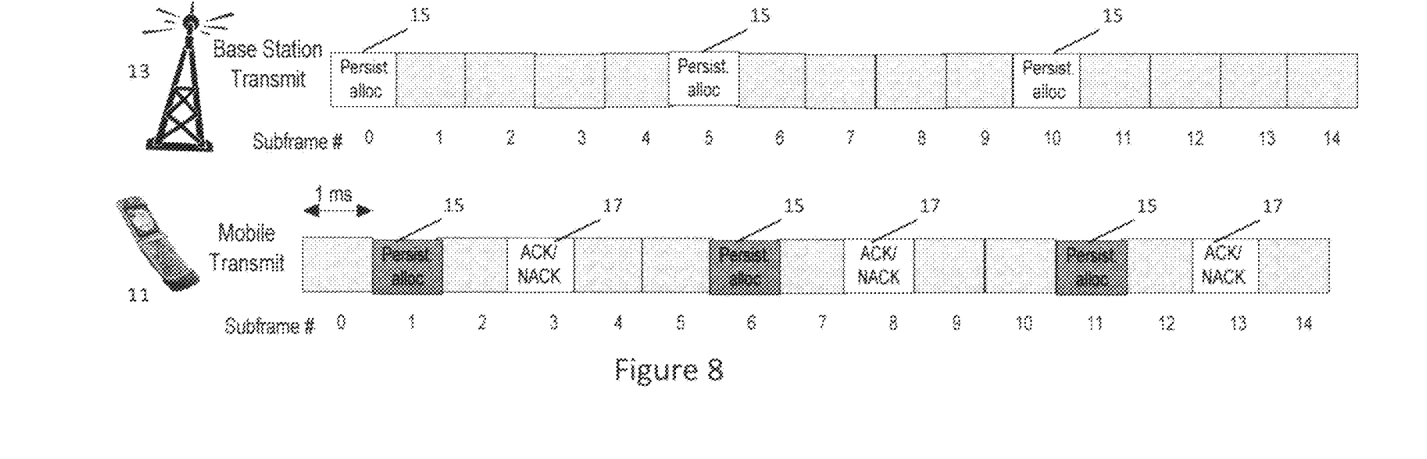
FIG. 8 is an example of persistent scheduling assignment in the uplink and downlink in order to avoid multiplexing according to this disclosure.

Now referring to FIG. 8, an example of persistent scheduling assignment of uplink and downlink such that uplink persistently scheduled transmissions do not take place at the same time as potential ACK/NACK 17 transmissions which are used in response to the downlink persistent allocation is shown. In this embodiment, the mobile is configured for persistent allocations for both the uplink and the downlink. Furthermore, the persistent allocation occurs every 5 subframes in time for both uplink and downlink. Lastly, we assume that the offset (X) equals 3 as in the previous examples. FIG. 8 shows a permitted persistent allocation assignment for the uplink and the downlink. In this figure, the offset between the uplink and downlink persistent scheduling assignment is 1 subframe. In this embodiment, multiplexing is not useful or necessary because the data transmission 15 and control transmissions 17, 19 do not occur in the same subframe. The persistent allocation offset is such that multiplexing is not necessary.

It should be noted that included in all four of the previous examples, scheduling should take the transmission of CQI 19 into account. One goal of this disclosure is to avoid multiplexing of all types of control and data signaling, including ACK/NACK and CQI 19.

It should be understood that the method may be implemented by a variety of software and/or hardware configurations. In one embodiment, the software implementing the above described method may reside in the variety of network elements throughout the telecommunication system. In another embodiment, the software and/or hardware implementing this method may be distributed on many appropriate network elements. In one form the software implementing the method is found in the base station scheduler 35.

The above description merely provides a disclosure of particular embodiments of the claimed invention and is not intended for the purposes of limiting the same thereto. As such, this disclosure is not limited to only the above-described embodiments. Rather, it is recognized that one skilled in the art could conceive alternative embodiments that fall within the scope of the invention.

I claim:

1. A method of coordinated scheduling for a telecommunication device comprising:
   scheduling uplink data transmissions, uplink data retransmissions and uplink control transmissions for subframe time positions by a first scheduling mode; and
   scheduling downlink data transmissions for subframe time positions by a second scheduling mode;
   where the uplink data transmissions, the uplink data retransmissions, and the uplink control transmissions are offset to take place in different subframe time positions;
   wherein said first scheduling mode is dynamic and said second scheduling mode is persistent.

2. The method according claim 1, further comprising identifying whether said telecommunication device is a power limited mobile prior to executing said coordinated scheduling.

3. The method according to claim 2, wherein said telecommunication device is identified as a power limited mobile via power headroom reporting.

4. The method according to claim 1, wherein scheduling said transmissions and retransmissions includes restricting downlink data transmissions in subframe time positions that would delegate responses in uplink control transmissions in subframe time positions that have persistently scheduled uplink data transmissions.

5. A method of coordinated scheduling for a telecommunication device comprising:
   scheduling uplink data transmissions, uplink data retransmissions and uplink control transmissions for subframe time positions by a first scheduling mode; and
   scheduling downlink data transmissions for subframe time positions by a second scheduling mode;
   where the uplink data transmissions, the uplink data retransmissions, and the uplink control transmissions are offset to take place in different subframe time positions;
   wherein said first scheduling mode is persistent and said second scheduling mode is dynamic.

6. The method according to claim 5, wherein scheduling said transmissions and retransmissions includes restricting uplink data transmissions in subframe time positions that have uplink control transmissions that are persistently scheduled in subframe time positions as responses to downlink data transmissions.

7. The method according to claim 5, further comprising identifying whether said telecommunication device is a power limited mobile prior to executing said coordinated scheduling.

8. The method according to claim 7, wherein said telecommunication device is identified as a power limited mobile via power headroom reporting.

9. A method of coordinated scheduling for a telecommunication device comprising:
   scheduling uplink data transmissions, uplink data retransmissions and uplink control transmissions for subframe time positions by a first scheduling mode; and
   scheduling downlink data transmissions for subframe time positions by a second scheduling mode;
   where the uplink data transmissions, the uplink data retransmissions, and the uplink control transmissions are offset to take place in different subframe time positions;
   wherein said first scheduling mode and said second scheduling mode are both persistent.

10. The method according to claim 9, further comprising scheduling allocations for said transmissions to take place with a time offset in subframe time positions so that scheduled transmissions do not coincide.

11. The method according to claim 9, further comprising identifying whether said telecommunication device is a power limited mobile prior to executing said coordinated scheduling.

12. The method according to claim 11, wherein said telecommunication device is identified as a power limited mobile via power headroom reporting.

13. A system for coordinated scheduling of control and data transmission, comprising:
a base station scheduler configured to control uplink transmissions for a mobile station according to a first schedule mode and downlink transmissions for a base station transmitter according to a second schedule mode;
wherein the mobile station is configured to transmit uplink control transmissions, uplink data transmissions, and uplink data retransmissions according to the first schedule mode;
wherein the base station transmitter is configured to transmit downlink data transmissions which call for certain uplink control transmissions according to the second schedule mode;
wherein the base station scheduler is configured to schedule said uplink control transmissions, uplink data transmissions, and uplink data retransmissions during subframe time positions by the first schedule mode and configured to schedule the downlink data transmissions during subframe time positions by the second schedule mode such that said uplink control transmissions, uplink data transmissions, and uplink data retransmissions are scheduled for subframe time positions that are offset from one another;
wherein said first schedule mode is persistent scheduling and said second schedule mode is dynamic scheduling and said base station scheduler prohibits said downlink data transmissions during subframe time positions that call for uplink control transmissions in subframe time positions where said uplink data transmissions are persistently scheduled.

14. The system according to claim 13, wherein said mobile station is a power limited mobile station.

15. The system according to claim 13, wherein said uplink control transmissions for responses to downlink data transmissions include ACK/NACK transmissions.

16. A system for coordinated scheduling of control and data transmission, comprising:
a base station scheduler configured to control uplink transmissions for a mobile station according to a first schedule mode and downlink transmissions for a base station transmitter according to a second schedule mode;
wherein the mobile station is configured to transmit uplink control transmissions, uplink data transmissions, and uplink data retransmissions according to the first schedule mode;
wherein the base station transmitter is configured to transmit downlink data transmissions which call for certain uplink control transmissions according to the second schedule mode;
wherein the base station scheduler is configured to schedule said uplink control transmissions, uplink data transmissions, and uplink data retransmissions during subframe time positions by the first schedule mode and configured to schedule the downlink data transmissions during subframe time positions by the second schedule mode such that said uplink control transmissions, uplink data transmissions, and uplink data retransmissions are scheduled for subframe time positions that are offset from one another;
wherein said first schedule mode is dynamic scheduling and said second schedule mode is persistent scheduling and said second schedule mode prohibits said uplink data transmissions during subframe time positions where said uplink control transmissions are persistently allocated.

17. The system according to claim 16, wherein said mobile station is a power limited mobile station.

18. The system according to claim 16, wherein said uplink control transmissions for responses to downlink data transmissions include ACK/NACK transmissions.

19. A system for coordinated scheduling of control and data transmission, comprising:
a base station scheduler configured to control uplink transmissions for a mobile station according to a first schedule mode and downlink transmissions for a base station transmitter according to a second schedule mode;
wherein the mobile station is configured to transmit uplink control transmissions, uplink data transmissions, and uplink data retransmissions according to the first schedule mode;
wherein the base station transmitter is configured to transmit downlink data transmissions which call for certain uplink control transmissions according to the second schedule mode;
wherein the base station scheduler is configured to schedule said uplink control transmissions, uplink data transmissions, and uplink data retransmissions during subframe time positions by the first schedule mode and configured to schedule the downlink data transmissions during subframe time positions by the second schedule mode such that said uplink control transmissions, uplink data transmissions, and uplink data retransmissions are scheduled for subframe time positions that are offset from one another;
wherein said first and second schedule modes are persistent scheduling and said uplink control transmissions, uplink data transmissions, uplink data retransmissions, and downlink data transmissions take place with a time offset in subframe time positions so that persistently scheduled uplink data transmissions, uplink data retransmissions, and uplink control transmissions take place in different subframe time positions.

20. The system according to claim 19, wherein said mobile station is a power limited mobile station.

21. The system according to claim 19, wherein said uplink control transmissions for responses to downlink data transmissions include ACK/NACK transmissions.

* * * * *